June 27, 1961 G. STILLE ET AL 2,990,052
CONVEYOR
Filed Nov. 12, 1958 2 Sheets-Sheet 1
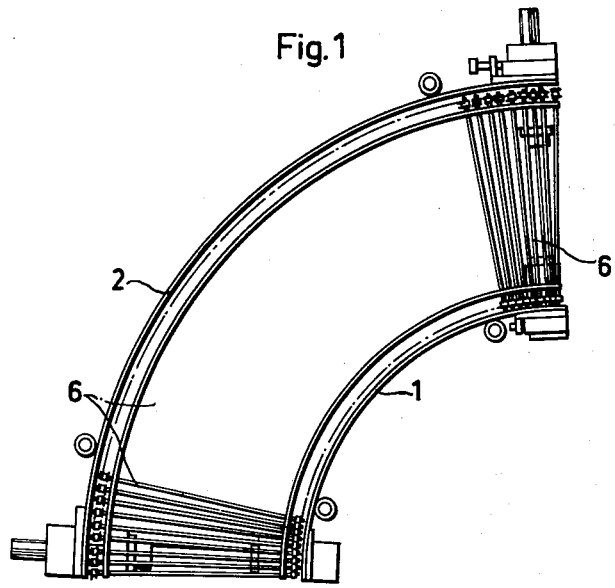
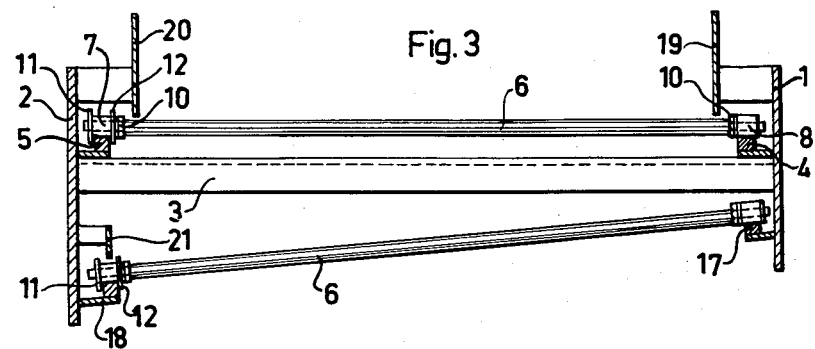
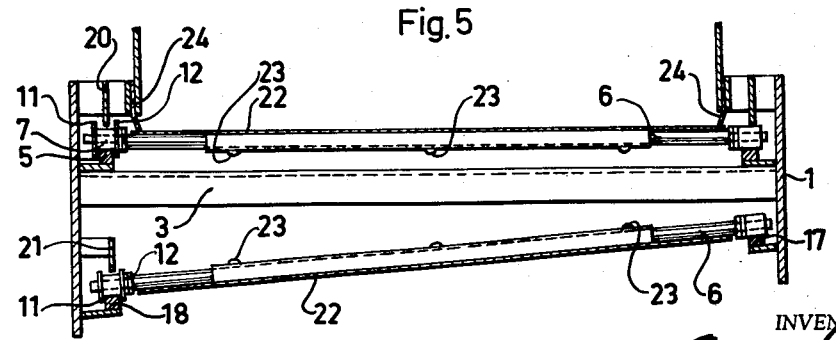

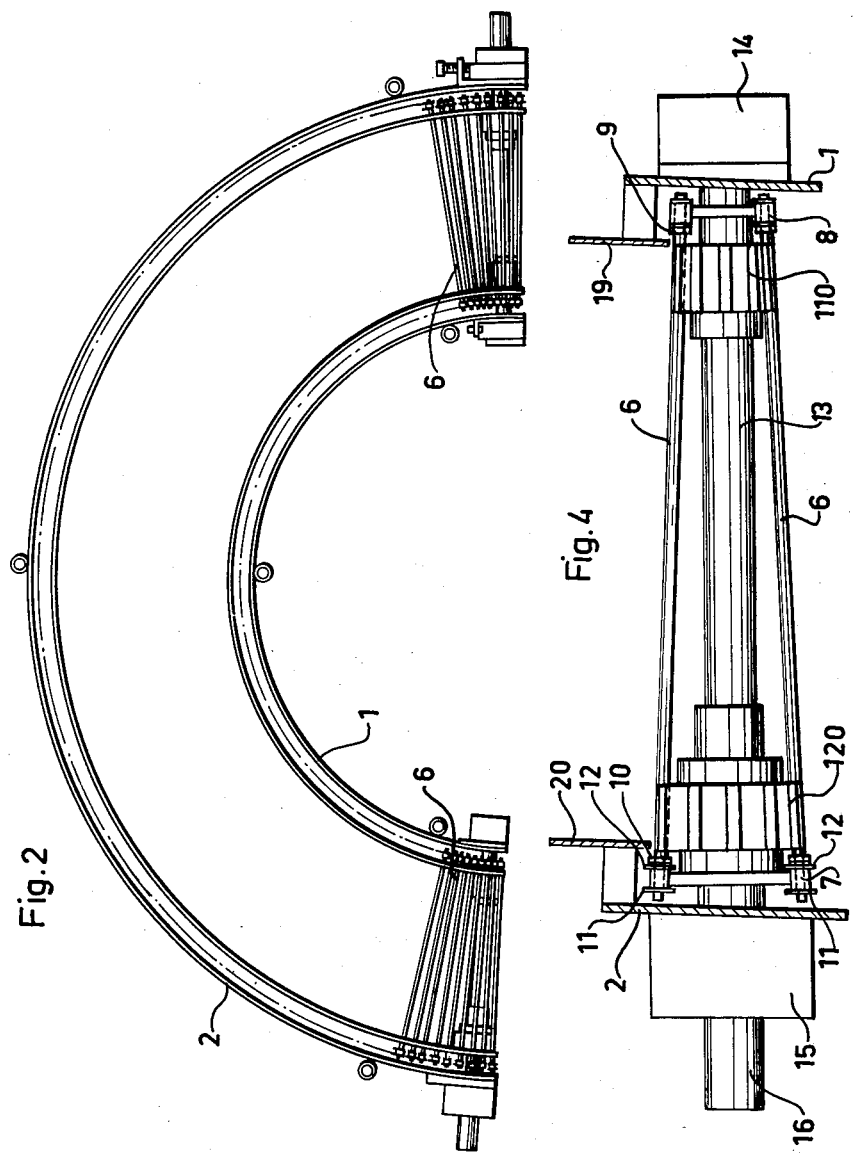

United States Patent Office 2,990,052
Patented June 27, 1961

2,990,052
CONVEYOR
Gunnar Stille, Djursholm, and David Ersson, Stockholm, Sweden, assignors to Stockholms Bageriaktiebolag, Stockholm, Sweden
Filed Nov. 12, 1958, Ser. No. 773,307
Claims priority, application Sweden Nov. 18, 1957
1 Claim. (Cl. 198—182)

This invention relates to a conveyor, preferably for the transport of goods on a curved conveying track which can, for example, connect two straight conveying tracks.

In curved conveying tracks of this kind it is known to arrange a number of supporting rolls for supporting the transported goods, each supporting roll being journalled at each end with respect to a rail which extends along each side of the conveying track. Preferably, the ends of the supporting rolls are held at a predetermined distance from each other by means of chain links which together form an endless chain running on either side of the conveying track.

The main object of the invention is to provide simple means for effecting, in a curved conveying track of this kind, effective guiding of the supporting rolls so that the forces arising, for example, as a result of the centrifugal force do not cause the supporting rolls to derail and cause interruption in the operation of the apparatus.

A further object of the invention is to provide the end portions of the supporting rolls, at least at one side of the conveying track, with flanges which straddle the guide rail and prevent the rolls from being forced out of their track under the influence of centrifugal and other transverse forces.

One embodiment of a conveyor according to the invention will now be described with reference to the accompanying drawing, in which:

FIG. 1 is a plan view of a conveying track according to the invention, in which the track extends over a quarter of a circle connecting two straight conveying tracks at right angles to each other;

FIG. 2 shows a semi-circular conveying track according to the invention;

FIG. 3 shows a cross section of the curved conveying track at an arbitrary place between its ends;

FIG. 4 shows a cross section of the conveying track close to its end where a driving shaft for the conveying track is arranged; and FIG. 5 shows a similar cross-section of another embodiment.

The conveying track of the invention comprises a frame having an inner, curved supporting plate 1 and an outer, likewise curved, supporting plate 2, the radius of curvature of supporting plate 2 being greater than that of supporting plate 1. The supporting plates 1 and 2 are held together by means of a number of transverse beams 3 (see FIG. 3), which are welded or in some other suitable manner fixed to the supporting plates. An inner and an outer guide-rail 4 and 5, respectively, are arranged on the beams 3 and are attached to said beams or to the supporting plates. A relatively large number of supporting rolls 6 are arranged for conveying goods and are provided at each end with bearing rolls 7 and 8, respectively. The bearing rolls engage the guide-rails 4 and 5 and are appropriately held together by chain-links 9 and 10 on the inner and outer sides, respectively, of the conveying track.

One of the bearing rolls of every supporting roll is provided with flanges 11 and 12 which straddle the guide rail 5 on which the supporting roll moves and in this way the bearing roll will function as a lateral guide for the supporting roll.

At each end of the conveying track the supporting rolls 6 engage toothed wheels 110 and 120 mounted on a shaft 13. The toothed wheels 110 and 120 have an equal number of teeth but are differently pitched, and the pitch of each toothed wheel is adjusted to the space between the supporting rolls 6 at the inner and/or outer side of the conveying track. The shaft 13 is mounted in journals 14 and 15, respectively, attached to the supporting plates 1 and 2. A projecting stub shaft 16 may be provided with a belt pulley (not shown) for driving the conveying track.

The supporting rolls at the lower, return part or run of the conveying track run by means of the bearing rolls 7 and 8 on guide-rails 17 and/or 18. Flanges 11 and 12 of the one roll can straddle the respective guide-rail, if desired, for the above-mentioned purpose.

To prevent the supporting rolls from rising above the conveying track, to such an extent that they might derail in spite of the arrangement of the flanges 11 and 12, guide plates 19 and 20, respectively, are arranged on the upper side of the conveying track, the lower edges of these guide plates being arranged only at a slight distance from the upper side of the supporting rolls. Similarly, a guide-plate 21 may be arranged at the lower part of the conveying track at a short distance from the rolls 7 having flanges 11 and 12.

The guide-plates 19 and 20 at the upper side of the conveying track can also serve as guide-surfaces for the transported goods so that such goods may be prevented from shifting sideways from the conveying track.

Although one specific embodiment of the invention has been described it is to be understood that a plurality of changes and modifications can be made within the scope of the appended claims.

According to FIG. 5 a track 22 of fabric, plastic material, rubber, or the like, is provided and attached to the rolls 6 by means of attachment devices 23 so that the conveying track will form a continuous unperforated track by means of which the transportation of flour and other pulverized materials is possible. To prevent this material from contacting the roller sections 7 flexible sheets 24 can be arranged to trail on the surface of the track. The fabric track need be attached only to some of the supporting rolls 6, for example by sewing a pocket in the track and inserting the supporting roll therein which subsequently is attached by means of the device 23.

What we claim is:

Conveyor having a curved conveying track and comprising a plurality of supporting rolls lying transversely to the conveying direction and arranged for carrying the transported merchandise, an outer and an inner curved guide rail extending along said conveying track for supporting and guiding the ends of said supporting rolls, said outer guide rail having a greater radius of curvature than said inner guide rail, and said supporting rolls extending radially from the inner guide rail to the outer guide rail, chain links for holding together the ends of said supporting rolls at predetermined distance from one another, said chain links together forming an endless chain running on each side of the conveying track, and pairs of flanges arranged at one end only of each supporting roll with the adjacent guide rail arranged between the two flanges of each pair for preventing the supporting rolls from being displaced from their tracks due to the action of forces acting laterally of the direction of motion of the conveyor, while allowing substantial variations in the distance between the two curved guide rails in such lateral direction.

References Cited in the file of this patent
UNITED STATES PATENTS

| 1,090,966 | Berghoefer | Mar. 24, 1914 |
| 2,633,975 | Koerber | Apr. 7, 1953 |
| 2,686,589 | Temple | Aug. 17, 1954 |